United States Patent [19]
Goldenberg et al.

[11] Patent Number: 5,527,169
[45] Date of Patent: Jun. 18, 1996

[54] DEVICE FOR REPAIRING PIPE JOINTS

[75] Inventors: Andrew A. Goldenberg, Toronto; Pawel Kuzan; Jacek Wiercienski, both of Oakville, all of Canada

[73] Assignee: The Consumers' Gas Company Ltd., Ontario, Canada

[21] Appl. No.: 193,412

[22] Filed: Feb. 7, 1994

[30] Foreign Application Priority Data

Dec. 20, 1993 [CA] Canada ................................. 2111876

[51] Int. Cl.⁶ ................................................ B29C 45/20
[52] U.S. Cl. .................... 425/11; 156/94; 264/36; 425/13
[58] Field of Search .................... 156/94; 264/36; 425/11, 13

[56] References Cited

U.S. PATENT DOCUMENTS

| | | | |
|---|---|---|---|
| 2,977,994 | 4/1961 | Xenis | 138/97 |
| 3,315,017 | 4/1967 | Kemp | 264/36 |
| 3,606,913 | 9/1971 | Yie | 138/97 |
| 4,421,698 | 12/1983 | Vanderlans | 264/40.1 |
| 4,442,891 | 4/1984 | Wood | 166/55.2 |
| 4,504,204 | 3/1985 | Koga | 425/11 |
| 4,582,551 | 4/1986 | Parkes et al. | 156/94 |
| 4,646,787 | 3/1987 | Rush et al. | 138/98 |
| 4,986,314 | 1/1991 | Himmler | 138/97 |
| 5,044,824 | 9/1991 | Long et al. | 405/156 |
| 5,223,272 | 6/1993 | Pringle | 425/13 |
| 5,259,880 | 11/1993 | Fujita et al. | 425/13 |

FOREIGN PATENT DOCUMENTS

| | | | |
|---|---|---|---|
| WO83/03457 | 10/1983 | WIPO | F16L 55/18 |
| WO93/05334 | 3/1993 | WIPO | F16L 55/26 |

*Primary Examiner*—Tim Heitbrink
*Attorney, Agent, or Firm*—Mark B. Eisen

[57] ABSTRACT

A device for repairing cast iron pipe joints comprises a head having a motor for actuating a tool and a body, the head being pivotally connected to the body so that it can be pivoted from an axial position to a radial position within the pipe. In a preferred embodiment, the head includes a motor driving a drill bit. A retractable foot is extended to force the head against the pipe wall to be pierced by the drill bit, following which sealant is injected into a hollow drill shaft and flows up the helical grooves of the drill bit into the pipe joint cavity. Preferably a pair of guide wings maintains the device centered in the pipe and raised off of the pipe floor, and the operator monitors progress of the device through a video monitor.

18 Claims, 9 Drawing Sheets

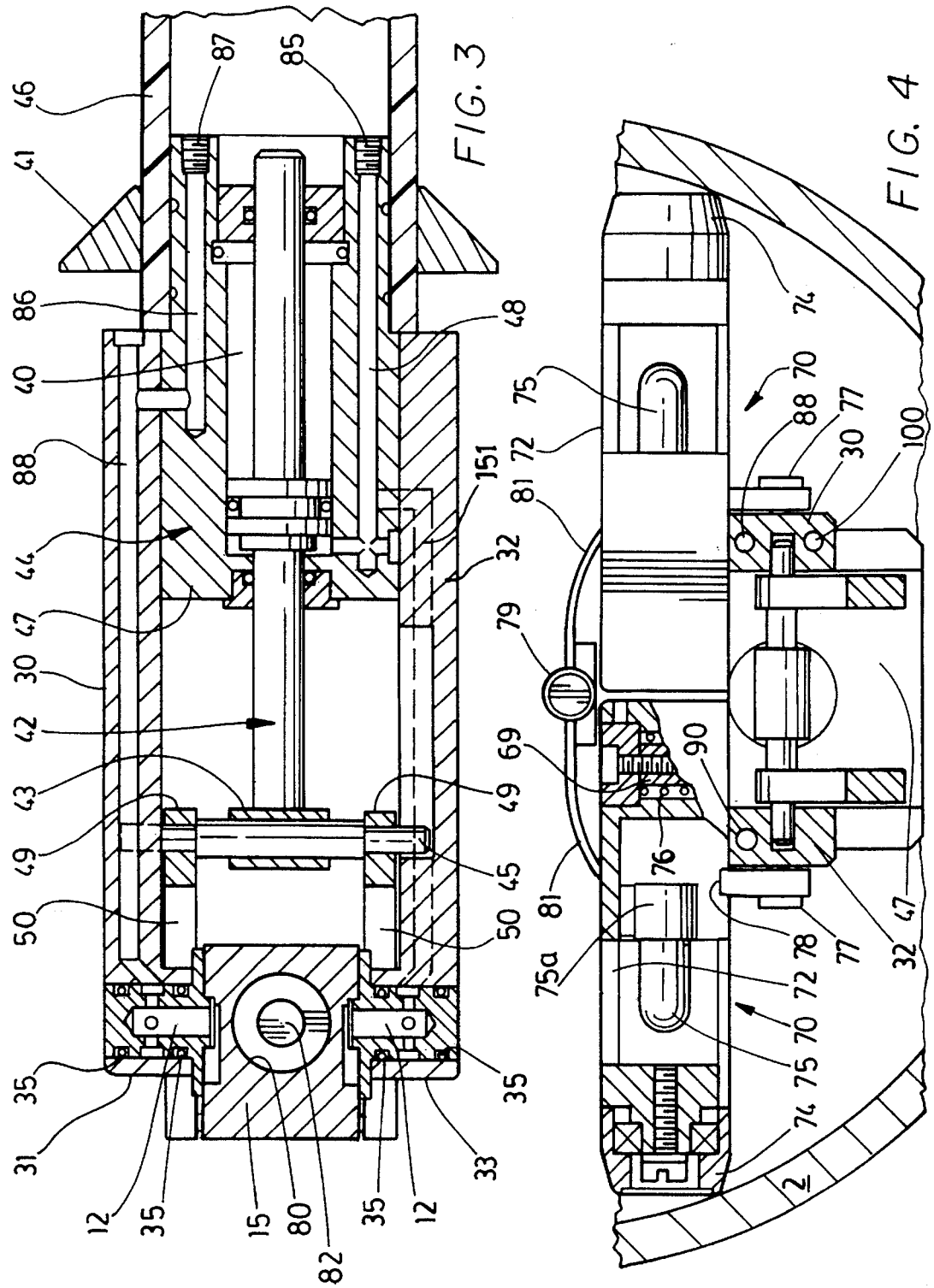

DEVICE FOR REPAIRING PIPE JOINTS

FIELD OF THE INVENTION

This invention relates to an apparatus for repairing pipe joints. In particular, this invention relates to a portable device for insertion into a cast iron pipe or the like for facilitating the location and repair of spigot joints from within the pipe.

BACKGROUND OF THE INVENTION

Underground pipelines are commonly used as fluid conduits for conveying utilities such as natural gas to an end user. Many existing pipelines are composed of sections of cast iron pipe connected by spigot joints, in which an end or "spigot" of one pipe section is interference-fitted into a "bell" or flared end of the next adjoining section, and the cavity between the bell and the spigot is filled with jute for a gas-tight seal.

Over time the jute tends to deteriorate, compromising the integrity of the joint seal, and must be repaired or replaced. Typically such pipelines are far too small for a person to enter, and such repairs have thus conventionally required excavation of the pipeline. This is a costly and time consuming process.

It is therefore advantageous to be able to effect repairs from inside the pipeline. For example, an apparatus capable of carrying out pipe repairs from inside the pipe is disclosed in U.S. Pat. No. 4,986,314. A working head provided with a tool holder is rotatably mounted on the front of a self-propelled trolley which can be inserted into a pipeline. A television camera allows the operator to locate damaged areas, and the tool holder can be fitted with the appropriate tool to effect repairs. The working head is rotatable circumferentially, to permit repairs on any part of the pipe wall.

Because the working head in this device is permanently mounted in a transverse orientation relative to the trolley, insertion of the device into a pipeline significantly reduces the effective cross-sectional area of the pipeline. This effect is exacerbated by the large trolley, which is provided with a blocking device that enables the trolley to support and resist the force of the working head when grinding, cutting etc. inside a pipe. Accordingly, the device of U.S. Pat. No. 4,986,314 still requires that the pipeline be shut down before repairs are undertaken. Moreover, the device will generally not fit through an existing opening in the pipeline, so the pipe must first be broken before the device can be introduced. These are significant disadvantages in the repair and maintenance of a natural gas pipeline.

The present invention provides a device for repairing pipes internally, and particularly for the sealing of spigot joints, which overcomes these and other disadvantages. The device comprises a cylindrical drill head pivotally mounted on a shackle so that it can be inserted into a pipeline and selectively pivoted from an axial orientation, for being fed along the pipeline, to a radial orientation for drilling into a pipe joint. The drill head is provided with a hydraulic foot which urges the drill bit against the interior of the pipe joint, and a sealant injection mechanism for injecting sealant into the jute. A camera transmits images of the pipe interior to the operator, who can thus locate and repair successive pipe joints without withdrawing the device from the pipeline.

The cross-sectional area occupied by the device of the present invention is minimal, particularly when the drill head is oriented axially. This allows the device to be used within a "live" natural gas pipeline, because the device is sufficiently compact so as not to interfere with the flow of gas. The provision of a hydraulic foot contained within the drill head not only eliminates the need for a bulky, trolley-like structure to oppose the force of drilling, but also provides significant precision in drilling depth. This is important in the drilling of pipe joints because the sealant must be injected directly into the cavity between the bell and the spigot, which is usually not very deep. These and other advantages will be apparent from the description of the invention which follows.

SUMMARY OF THE INVENTION

The present invention thus provides a device for repairing a pipe, the device comprising a body, a head containing a motor for rotating a tool having a working axis, and a foot for urging the tool against a wall of the pipe, the head being pivotally connected to the body such that the head can be selectively pivoted between an axial position in which the working axis is oriented axially relative to the pipe and a radial position in which the working axis is oriented radially relative to the pipe, and means for selectively pivoting the head between the axial and radial positions.

The present invention further provides a device for injecting sealant into a pipe joint comprising a body, a head containing a motor engaged to a drill bit and a foot for urging the drill bit against the pipe joint, the head being pivotally connected to the body such that the head can be selectively pivoted between an axial position in which the drill bit is oriented axially relative to the pipe and a radial position in which the drill bit is oriented radially relative to the pipe, means for selectively pivoting the head between the axial and radial positions, and means for injecting sealant into the pipe joint.

BRIEF DESCRIPTION OF THE DRAWINGS

In drawings which illustrate by way of example only a preferred embodiment of the invention.

FIG. 3 is a cross section taken from the bottom along the line 3—3 in FIG. 2;

FIG. 4 is a cross section taken along the line 4—4 in FIG. 2;

DETAILED DESCRIPTION OF THE INVENTION

Figure 1:
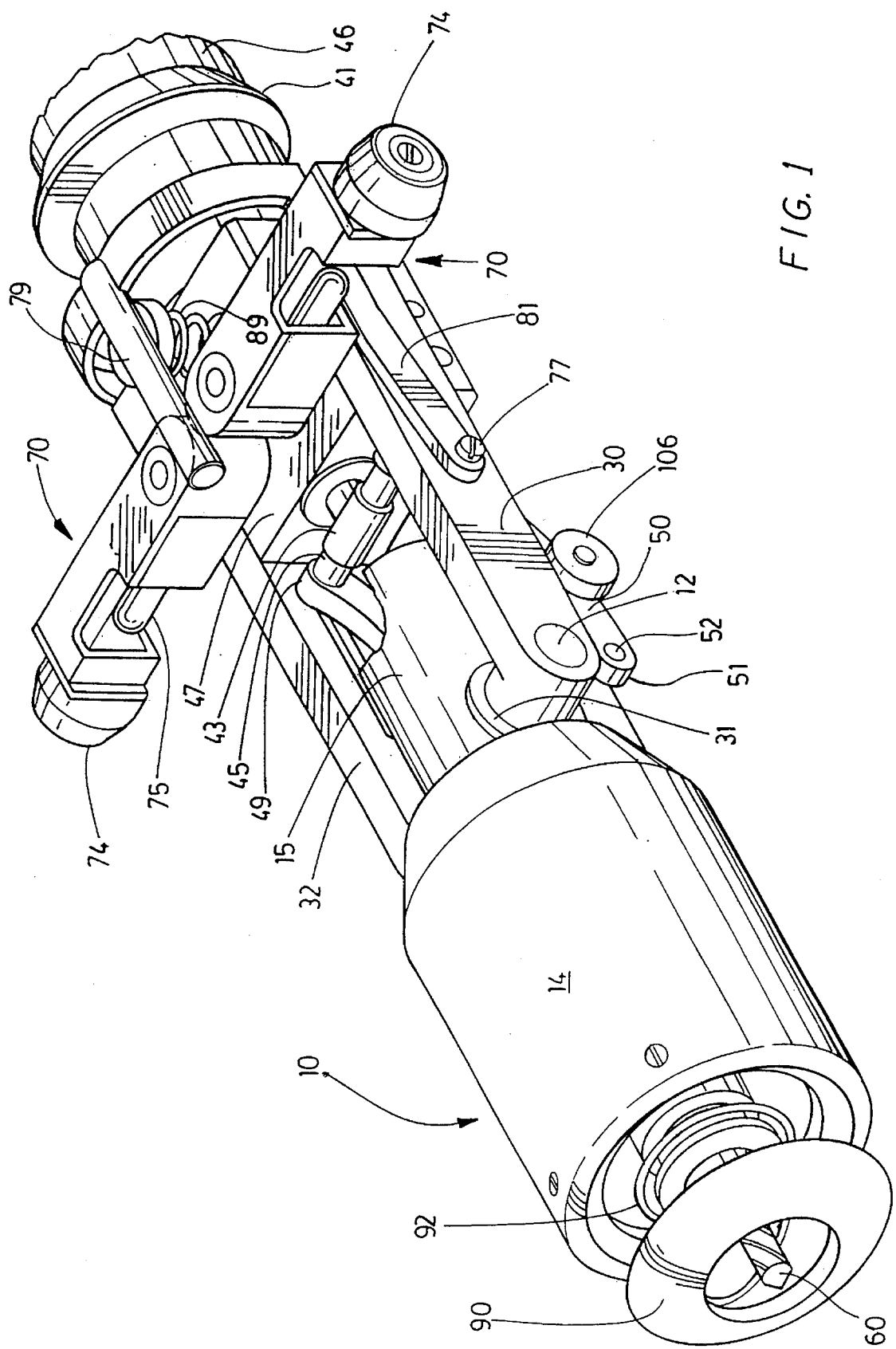
FIG. 1 is a perspective view of the head of the device with the drill head in the axial position.
Figure 2:
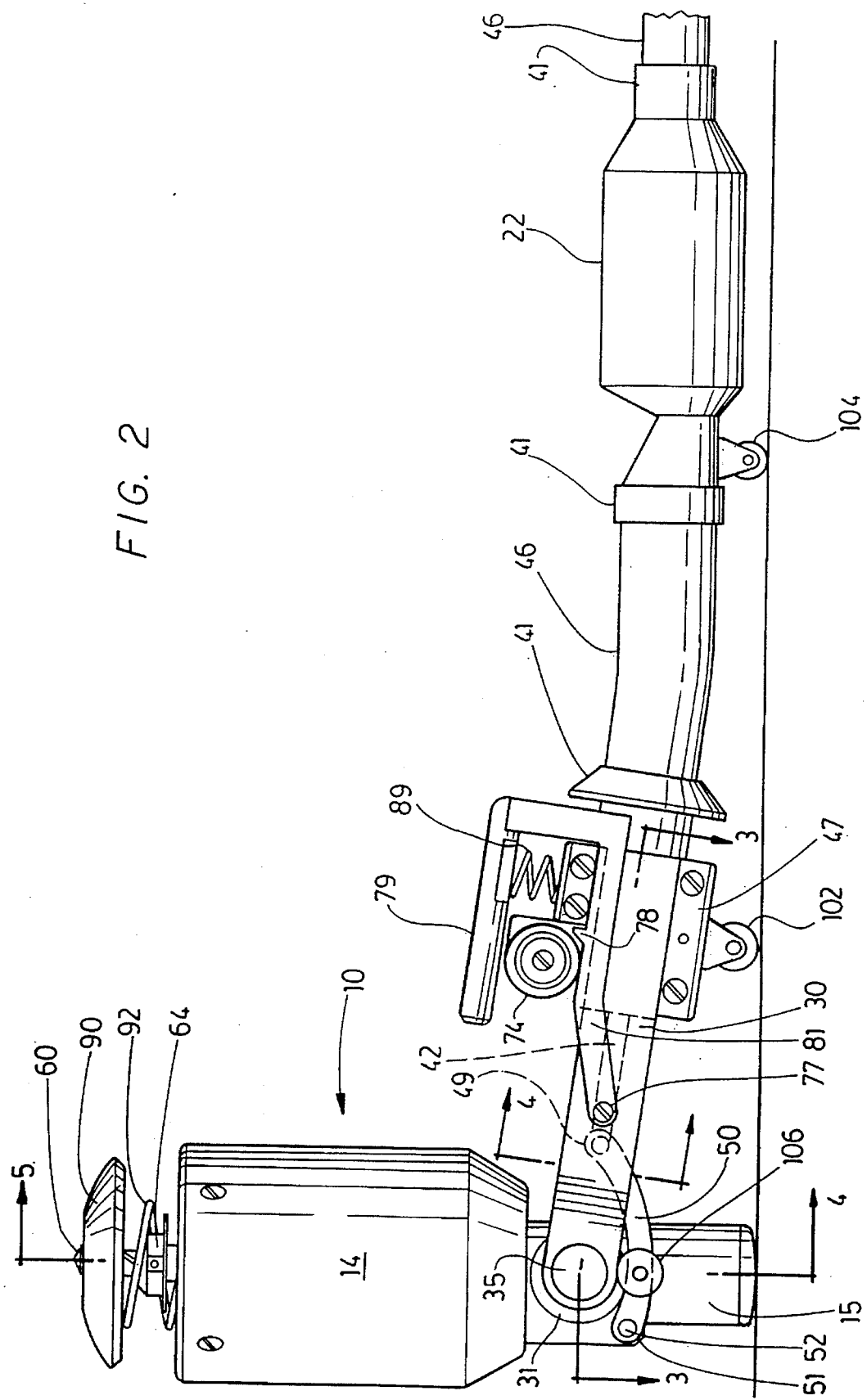
FIG. 2 is a side elevation of the device with the drill head in the radial, position.

As illustrated in FIGS. 1–6, in a preferred embodiment the invention comprises a head 10 pivotally connected by pivot pins 12 to spaced shackle arms 30,32 protruding forwardly from a body 44. The head 10 is generally cylindrical in cross-section and housed in smooth metallic casing 14, preferably composed of stainless steel.

Figure 11:
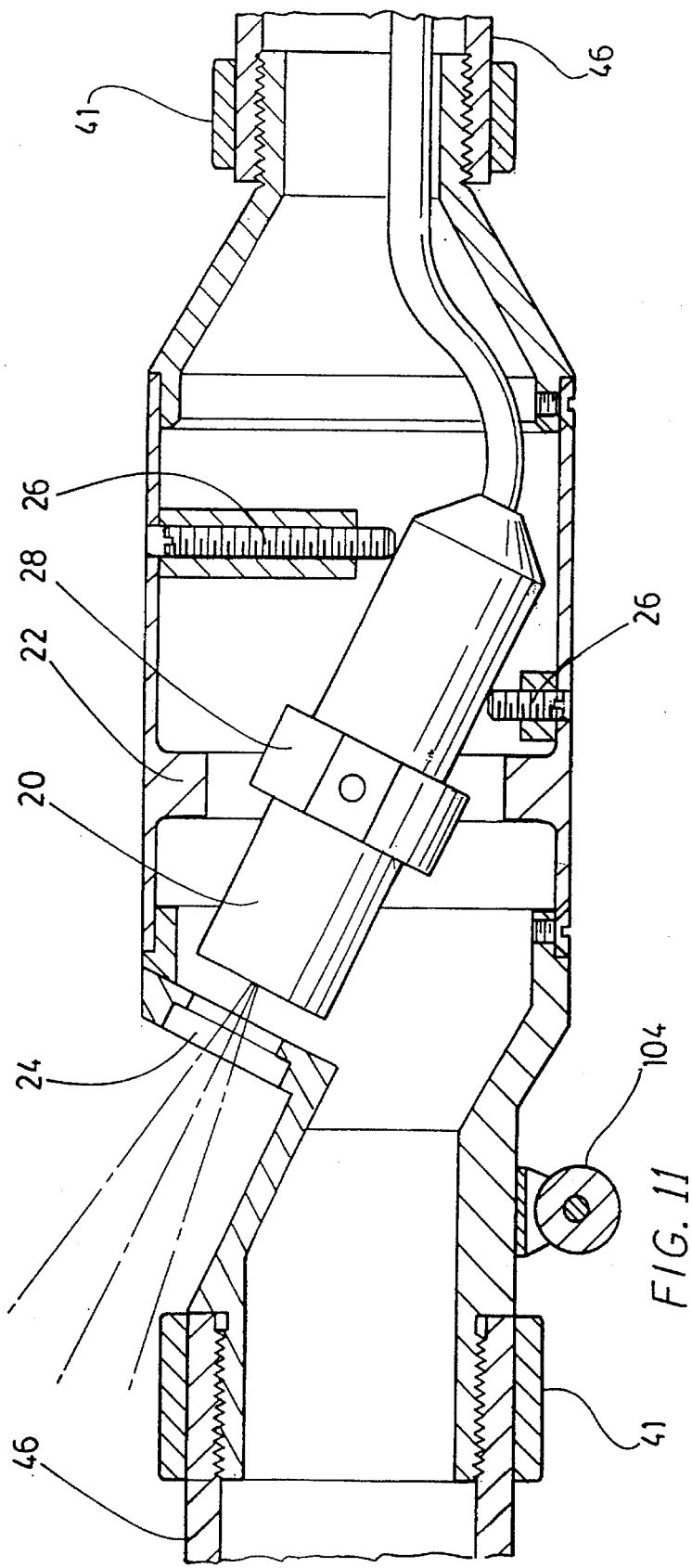
FIG. 11 is a cross-sectional view of the camera housing.

Attached to the rear of the body 44 by a compression ring 41 is a short length of flexible plastic tubing 46 connected to a cylindrical housing 22 containing a miniature video camera 20, illustrated in FIG. 11, for monitoring the progress of the device. The housing 22 includes an indentation having a window 24, through which the camera 20 is directed. The camera 20 is retained in position by a clamp 28, and locking screws 26 which allow the direction of the camera 20 to be adjusted as required. The housing 22 is fixed to the plastic tubing 46 by a compression ring 41 so that the body 44 will not rotate relative to the camera 20.

The body 44 is a hydraulic cylinder block with a cylinder 40 containing a head piston 42 fed through a passage 48 in the wall of the body 44 by a hose (not shown) connected between the inlet 85 and an external pneumatic/hydraulic drive described below. The front end of the head piston 42 is provided with a cylindrical member 43 engaging a pin 45 pivotally connecting the rear ends 49 of articulating arms 50, the front ends 51 of which are pivotally attached at 52 to a neck portion 15 integral with or attached to the drill head casing 14. This allows the head 10 to be pivoted from an axial position, in which the working axis of the tool is axial relative to the pipe 2, to a radial position in which the working axis of the tool is radial relative to the pipe 2.

The shackle arms 30,32 are bolted to the walls of a front block portion 47 of the body 44. The shackle arms 30,32 must be spaced so as to allow the articulating arms 50 to pivot freely between the shackle arms 30,32 and to allow clearance for wheels 106. The articulating arms 50 are preferably curvate to allow the head 10 to pivot to the radial position shown in FIG. 2 without the articulating arms 50 coming into contact with the hubs 31,33 of the shackle arms 30,32, and for this purpose the articulating arms 50 attach to the neck 15 at a point near its bottom rear corner when the head 10 is in the axial position shown in FIG. 1 (which becomes the bottom front corner when the head 10 is pivoted to the radial position of FIG. 2).

A wheel 106 is rotatably attached to the articulating arms 50 as shown. The bottom of the block portion 47 of the body 44 is provided with a roller 102, and the bottom of the camera housing 22 is provided with a roller 104. The device rolls along the floor of the pipe 2 on these two rollers 102, 104 and the wheels 106.

A pair of stabilizing arms 70 is pivotally attached to the top of the block 47, for keeping the device upright and centred as it is fed through a pipe 2. Each stabilizing arm 70 comprises a hollow rigid bar 72 generally shaped in cross-section like an inverted "L" with cutouts for the lights 75 and front cover plates for the light sockets. Each stabilizing arm 70 is bolted to a post 69 at its inner end and has a steel roller 74 attached to its outer end. The stabilizing arms 70 are each biased by torsion springs 76 to a radial position extending laterally from the shackle arms 30,32 and are each held in extended position by a detent 78 projecting from a bar 81 pivotally attached to the outside surface of each shackle arm at 77. The bars 81 connect and form an arch over the body 44, the apex of which is provided with a trigger bar 79 which is spring-biased by a compression spring 89 to the locked position, in which each detent 78 blocks the bottom edge of its respective stabilizing arm 70, as shown in FIG. 4. By depressing the trigger 79 the bars 81 are pivoted downwardly, lowering the detents 78 and releasing the stabilizing arms 70. Each stabilizing arm 70 is provided with a 12 V/20 W halogen light bulb 75 aimed such that when the stabilizing arms 70 are extended and the head 10 is in the radial position light is directed toward the tip of the drill bit 60.

By releasing the detents 78 the stabilizing arms 70 may be collapsed inwardly, toward the front of the shackle arms 30,32 (as shown in phantom in FIG. 6), which permits insertion of the device into a small pipe opening. The stabilizing arms 70 are of equal length, the length being selected according to the diameter of pipe 2 being repaired such that as the device rolls along the floor of the pipe 2 the fully extended stabilizing arms 70 will generally roll along the sides of the pipe 2, as shown in FIG. 4. By mounting the stabilizing arms 70 on top of the block portion 47, the centre of gravity of the upright device is below the level of the stabilizing arms 70 so the device remains generally upright as it is being fed through the pipe 2; because the stabilizing arms are of equal length, the device remains generally centered within the pipe 2.

The head 10 contains a brushless electric motor 110 for driving a tool, the tool in the embodiment illustrated being a drill bit 60 which is engaged to a hollow drill shaft 62 by an adapter 64. The motor 110 is supplied by a 40 volt/5 amp external power driver. Electric wires powering the drill motor 110 may be fed through a passage 100 in the shackle arm 30, beneath and parallel to the hydraulic passage 88.

An annular nose 90 is engaged to and biased away from the head 10 by a compression spring 92 seated inside the drill head casing 14 in an annular groove 94, such that the outer surface of the nose 90 is generally flush with the tip of the drill bit 60. The nose 90 serves to stabilize the head 10 during drilling, and to push the head 10 away from the wall of the pipe 2 once drilling is complete, to retract the drill bit 60 from the pipe wall.

The neck 15 of the drill head 10 is a hydraulic cylinder block having a cylinder 80, which is provided with a hydraulic foot piston 82 fed through the hub 31 from a passage 86 through the body 44 communicating with a passage 88 through the shackle arm 30, by a hose (not shown) connected between the inlet 87 of the hydraulic passage 86 and an external pneumatic/hydraulic driver, described below. The hub 31 is sealed with O-rings 35 to contain the hydraulic oil. The foot piston 82 acts as a retractable foot, which is actuated when the head 10 is in the radial position to force the drill bit 60 against the wall of the pipe 2.

In the sealant injection system, an anaerobic sealant is pumped from a reservoir 120 by an external sealant pump 122 through a hose 124 connected to a sealant inlet located at the rear of the body 44 above the hydraulic inlet 85. The sealant pump 122 pumps a fluid sealant through a passage in the body 44 (above and parallel to the passage 48) communicating with a passage 151 through the shackle arm 32, and from the hub 33 of shackle arm 32 into the hollow drive shaft 62, as shown by the arrow in FIG. 5. The hub 33 is sealed with O-rings 35 to contain the sealant. The sealant will be pumped into the helical grooves of the drill bit 60 (or through a hollow drill bit) once the spigot 4 of the pipe joint has been penetrated.

Figure 8:
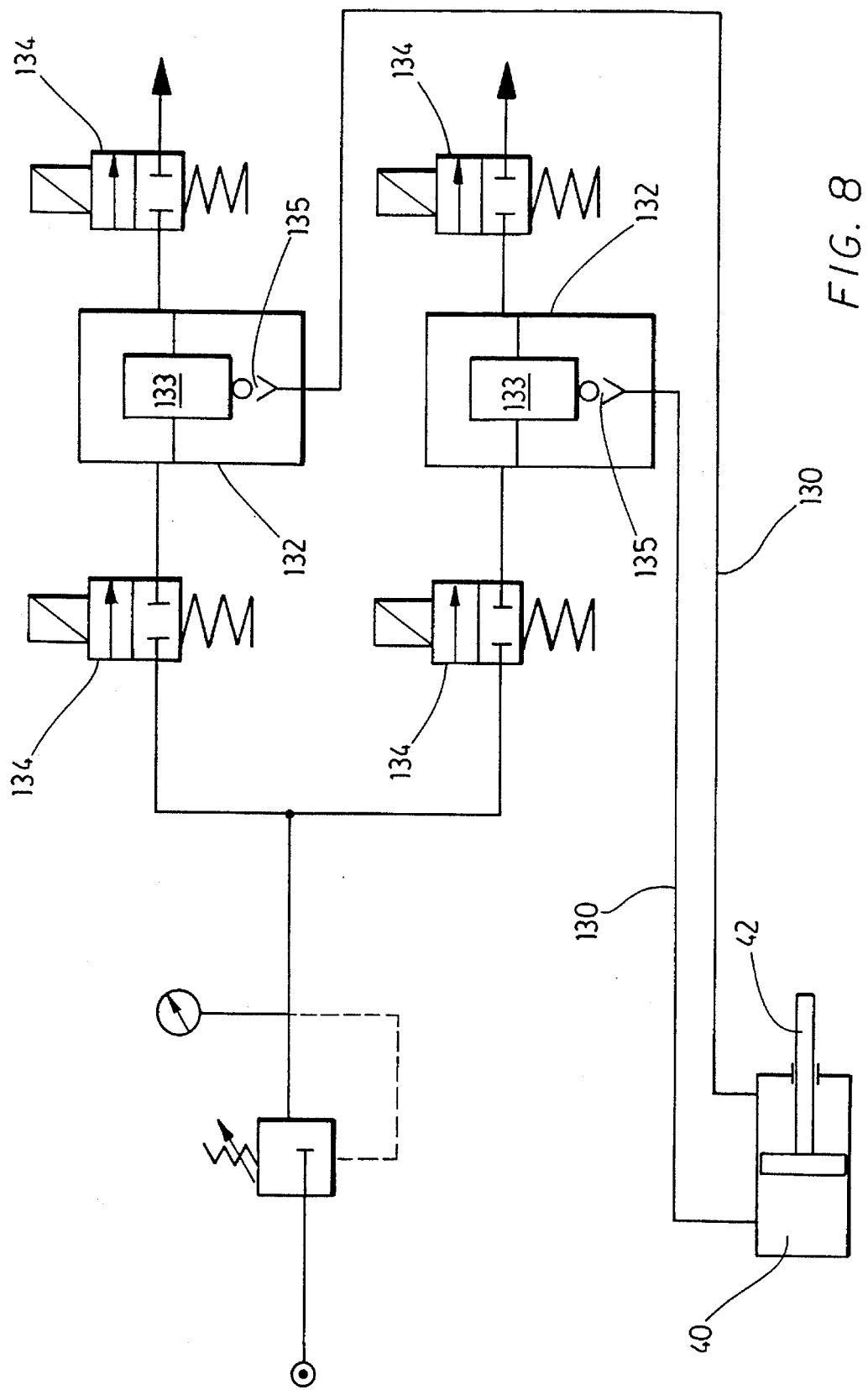
FIG. 8 is a schematic view of the hydraulic system for the head piston.
Figure 9:
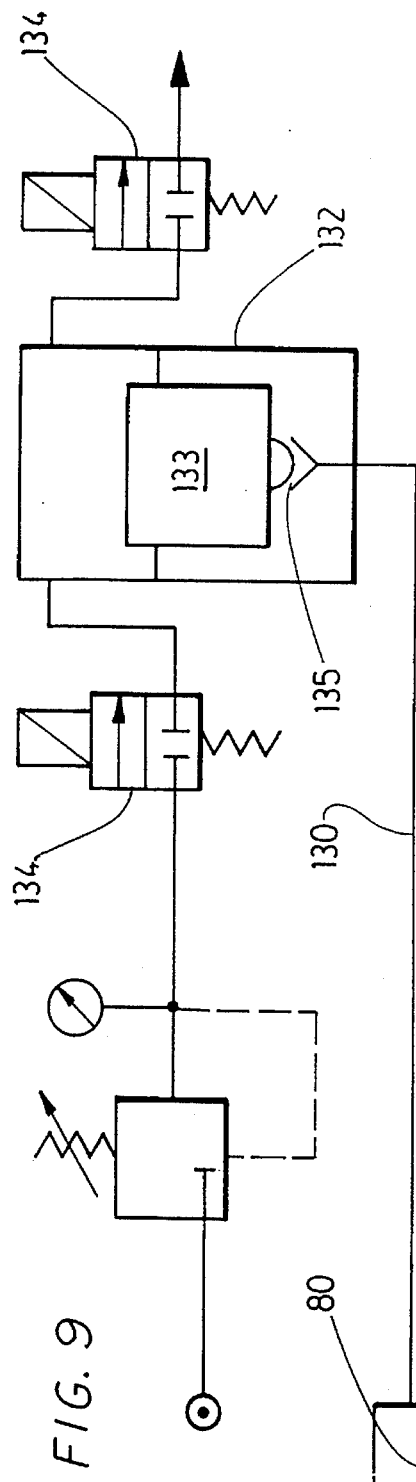
FIG. 9 is a schematic view of the hydraulic system for the foot piston.
Figure 10:
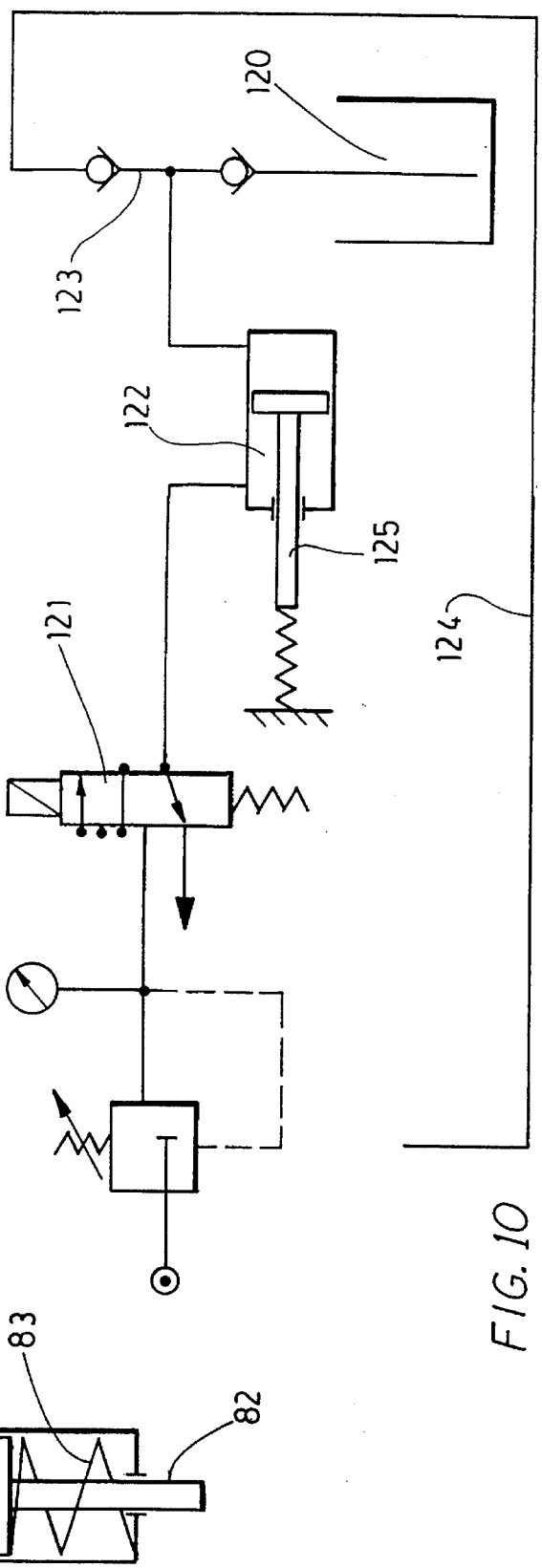
FIG. 10 is a schematic view of the sealant injection system.

The hydraulic cylinders 40, 80 are fed by medium pressure 1/8" (OD) plastic hoses 130 to the inlets 85, 87 at the rear of the body 44. The drive system preferably comprises a combination of hydraulic and pneumatic systems, as illustrated in FIGS. 8 and 9, whereby the plastic feeding hoses 130 are each connected to a pressure-sealed vessel 132 and filled with hydraulic oil. The vessel 132 is partially filled with hydraulic oil, the space above the oil being taken up by a relatively inert gas such as nitrogen. Two such pneumatic/hydraulic drive systems are employed for the head cylinder 40, to pivot the head 10 in both directions, and one is employed for the cylinder 80 for the foot piston 82 (since the nose 90 is spring-loaded, the spring 92 will force the foot piston 82 to retract and a separate drive is not required). Each drive system uses two solenoid valves 134, one to supply pressure to the vessel 132 through a standard pressure regulator (not shown) and one to release pressure from the vessel 132.

A high pressure compressed gas cylinder (not shown) distributes gas to the pneumatic solenoid valves 134 supplying gas to the vessels 132. Each solenoid valve 134 operates from a 12 volt power supply, and actuation of each valve 134 will result in either pressurization or depressurization of the vessel 132 to which it is attached.

The pneumatic/hydraulic reservoirs 132 are preferably provided with a float 133 suspending a blocking valve 135, so that if the oil level drops below the level of the line out the valve 135 automatically shuts off oil flow. Preferably the solenoid valves for activating the head piston 42 and foot piston 82 operate through pressure regulators with ranges of 0 to 500 p.s.i. and 0 to 300 p.s.i., respectively.

A fourth solenoid valve, connected to a pressure regulator having an adjustable range of 0 to 100 p.s.i., is used to supply pressure to the sealant pump 122, which comprises a standard pneumatic cylinder with a shuttle valve 123. The cylinder piston 125 is spring-loaded to suck sealant into one of the actuator chambers when pressure is not applied to the opposite chamber. When the three-way control solenoid valve 121 is activated, gas in one chamber compresses the sealant in the other chamber and forces sealant into the sealant line 124, as described above. All components of the pump 122 and shuttle valve 123 are made of aluminum, plastic or rubber in order to avoid settling of the anaerobic sealant.

Figure 7:
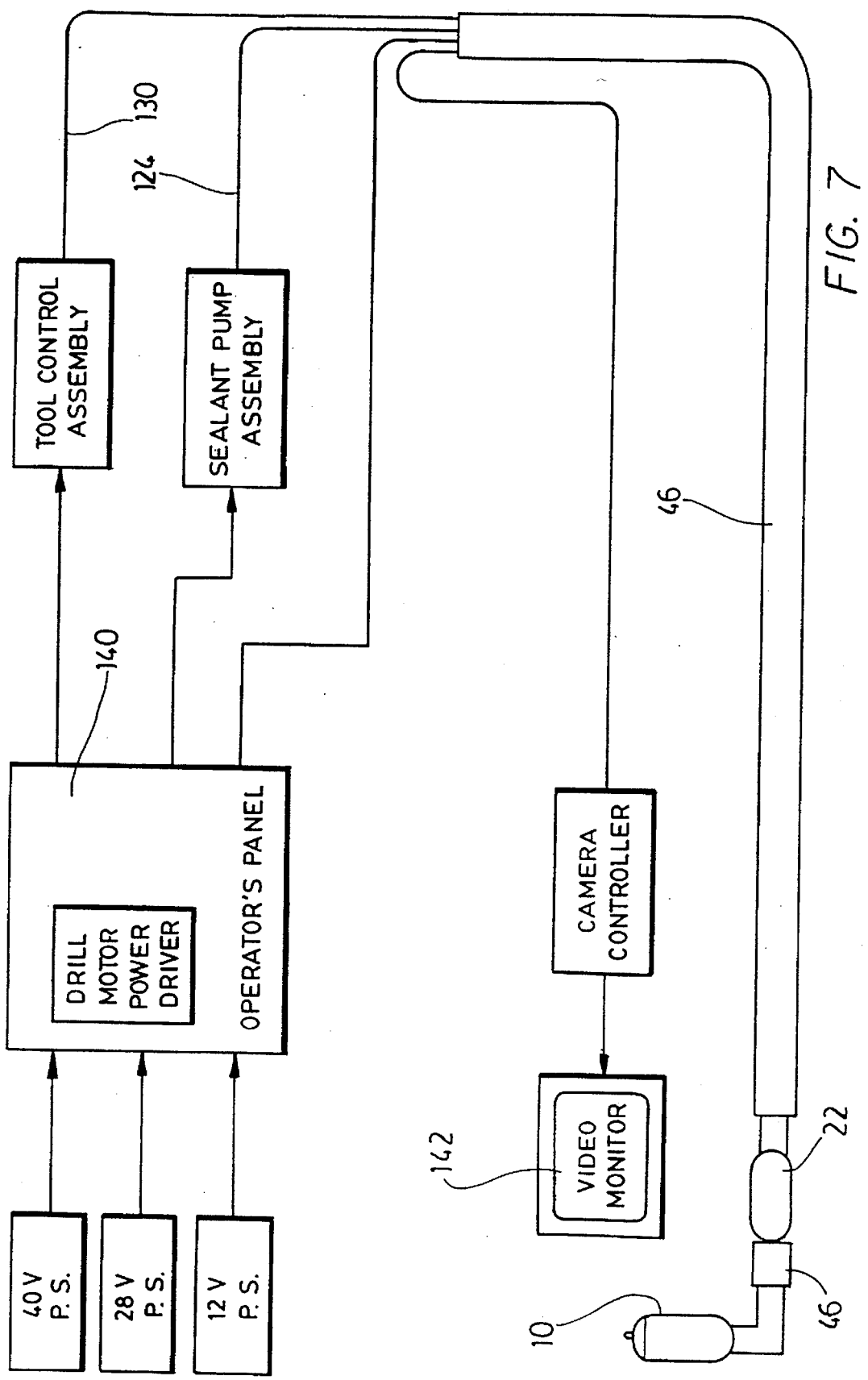
FIG. 7 is a schematic view of the electrical control system for the device.

An electrical control panel 140 containing a power driver for the electric motor 110 and toggle switches controlling the electrical control systems of FIG. 7 distributes the power supplies to the drill motor 110, the pneumatic solenoid valves 134, the lights 75 (connected in series and powered by a 28 V supply) and the camera 20 which is focussed on the point to which the light is directed (ie. the tip of the drill bit 60 in the drilling position). The control panel, pneumatic/hydraulic systems and the sealant pump 122 and reservoir 120 are all located outside of the pipeline for access by the operator, as is the video monitor 142 which allows the operator to monitor the progress of the device.

The hoses 130 feeding the hydraulic pistons, the sealant hose 124 and all electrical wires are encased in a flexible 1.25" OD/1" ID non-braided clear polyethylene hose 46, which is smooth, flexible and sufficiently thick to protect the hoses 124, 130 and wires, along with a ⅜" diameter solid pultruded fibreglass rod (not shown) which prevents the hose 46 from buckling or bunching up inside the pipe 2 but is sufficiently flexible to ensure uniform feeding without coiling or bunching up as the device is moved within the pipe 2. Hoses 124, 130 and electrical wires are fed through the hose 46 and the camera housing 22 to the body 44 of the device. If the device is to be used in the presence of flammable or explosive fluids such as natural gas, all electrical contact points should be properly sealed to avoid ignition.

The operation of the device will now be described with reference to the pipe joint repair embodiment of the invention illustrated. The head 10 is set to the axial position, the trigger bar 79 is depressed and the stabilizing arms 70 are manually collapsed as the operator inserts the device into a pipe opening and pushes it along the pipeline by manually or mechanically feeding the hose 46 into the pipe 2. The camera 20 and lights 75 are activated, to allow the operator to locate joints from within the pipe 2 and so that the operator can monitor the device to ensure that it remains generally upright as it is being fed through the pipe 2 with the head 10 in the axial position. The pitch of the device may deviate slightly from the true vertical as the device is being fed into the pipe 2, but in general the stabilizing arms 70 will maintain the device in an upright orientation, within a few degrees, so that when the drill head 10 is pivoted to the radial position its working axis will point toward the top wall of the pipe 2.

Figure 5:
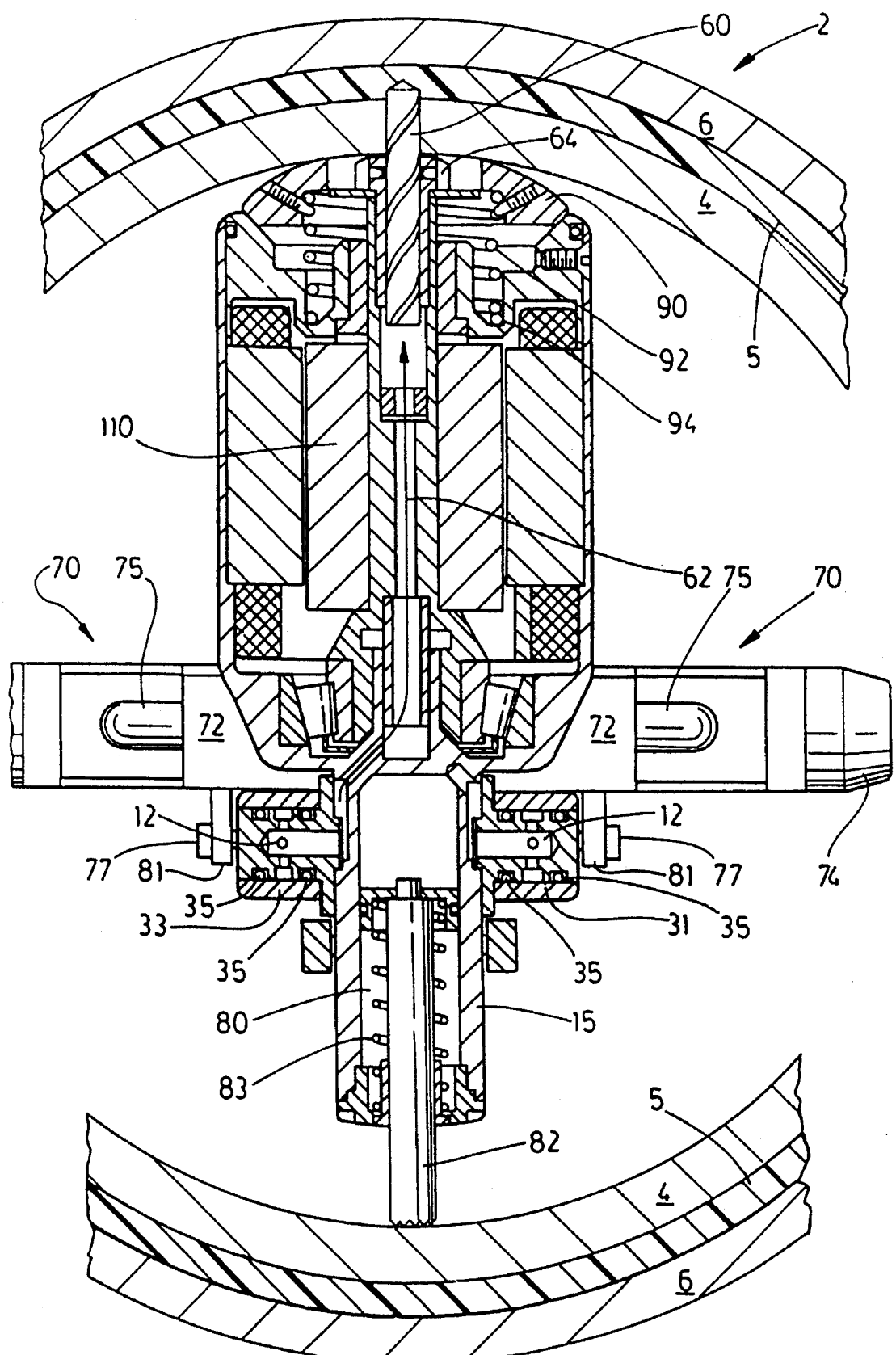
FIG. 5 is a front sectional elevation of the device in the radial position with the foot extended.
Figure 6:
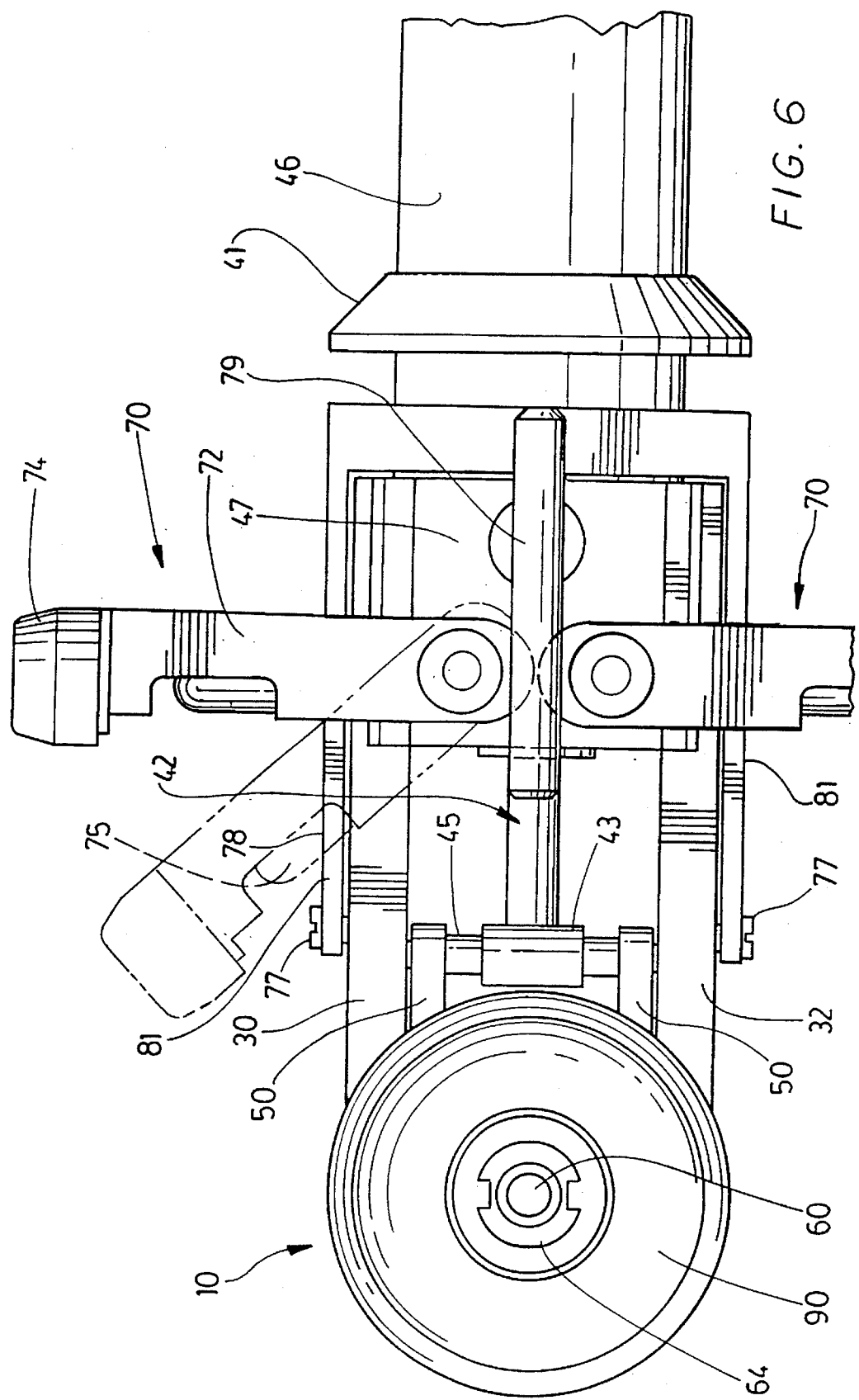
FIG. 6 is a top plan view of the device with the drill head in the radial position.

When a pipe joint is located, the operator actuates the hydraulic head piston 42 to pivot the head 10 to the radial (drilling) position, shown in FIG. 4. The operator then activates the drill motor 110 and actuates the hydraulic foot piston 82, extending the foot 82 so that it bears against the bottom wall of the pipe 2 and forces the head 10 upwardly so that the drill bit 60 contacts the top wall of the pipe 2 and, with continued extension of the foot 82, penetrates through the spigot 4 until the adapter 64 contacts the pipe wall (see FIG. 5). The length of the drill bit 60 is chosen so that the tip of the drill bit 60 will fully penetrate the spigot 4 just as the adapter 64 contacts the pipe wall, as illustrated in FIG. 5, to prevent accidental penetration of the bell 6.

With the tip of the drill bit 60 in the cavity 5 between the bell 6 and the spigot 4, which is filled with aged jute, the operator stops the drill motor 110 and activates the sealant pump 122, pumping a preascertained amount of anaerobic sealant (depending on the calculated volume of the cavity 5) into the helical grooves of the drill bit 60. The sealant flows up the grooves and is thereby injected into the cavity 5, and the combination of capillary action and gravity carries sealant around the jute to fill the entire cavity 5.

The operator then releases pressure on the foot piston 82, and the compression spring 92 forces the drill head 10 away from the pipe wall. The nose 90 continues to bear against the top wall of the pipe 2 and the spring 92 thus forces the drill head 10 downwardly as the foot 82 retracts, withdrawing the drill bit 60 from the wall of the spigot 4. When the drill bit 60 is completely withdrawn, the operator actuates the hydraulic head piston 42 to return the drill head 10 to the axial position. The device may then be fed further down the pipe 2 for repair of other joints, or may be withdrawn from the pipe 2. As the device is pulled out of the pipe opening the stabilizing arms 70 are collapsed to allow the device to pass through.

The invention having thus been described with reference to a preferred embodiment thereof, it will be obvious to those skilled in the art that certain modifications and adaptations may be made without departing from the scope of the invention, as set out in the appended claims.

We claim:

1. A device for repairing a pipe, the device comprising a body, a head containing a motor for rotating a tool having a working axis, and a foot for urging the tool against a wall of the pipe, the head being pivotally connected to the body such that the head can be selectively pivoted between an axial position in which the working axis is oriented axially relative to the pipe and a radial position in which the working axis is oriented radially relative to the pipe, means for selectively pivoting the head between the axial and radial positions, and means for injecting a sealant into the pipe.

2. The device according to claim 1 in which the head is provided with an extendable foot opposite the tool, which when extended forces the tool against a wall of the pipe.

3. The device according to claim 1 including a pair of stabilizing arms extending laterally from the body to centre the device within a pipe.

4. The device according to claim 3 in which the stabilizing arms are secured to a top surface of the body such that a center of gravity of the device is below the level of the stabilizing arms.

5. The device according to claim 4 in which the stabilizing arms are pivotally attached to the body.

6. The device according to claim 3 in which the stabilizing arms are provided with rollers at their outer ends.

7. The device according to claim 2 in which the tool is a drill bit and the means for injecting a sealant into the pipe includes a hollow drill shaft in communication with a pump for injecting said sealant into the drill shaft and thereby into helical grooves of the drill bit.

8. The device according to claim 2 in which the head is provided with an annular nose biased away from the head in opposition to the direction of the foot.

9. The device according to claim 1 in which the head is pivotally connected to a pair of spaced apart shackle arms extending forwardly of the body, and means for selectively pivoting the head comprises a piston pivotally attached to rear ends of articulating arms, the front ends of which are pivotally attached to the head.

10. A device for injecting sealant into a pipe joint comprising a body, a head containing a motor engaged to a drill bit and a foot for urging the drill bit against the pipe joint, the head being pivotally connected to the body such that the head can be selectively pivoted between an axial position in which the drill bit is oriented axially relative to the pipe and a radial position in which the drill bit is oriented radially relative to the pipe, means for selectively pivoting the head between the axial and radial positions, and means for injecting sealant into the pipe joint.

11. The device according to claim 10 in which the head is provided with an extendable foot opposite the tool, which when extended forces the tool against a wall of the pipe.

12. The device according to claim 10 including a pair of stabilizing arms extending laterally from the body to centre the device within a pipe.

13. The device according to claim 12 in which the stabilizing arms are secured to a top surface of the body such that a centre of gravity of the device is below the level of the stabilizing arms.

14. The device according to claim 13 in which the stabilizing arms are pivotally attached to the body.

15. The device according to claim 12 in which the stabilizing arms are provided with rollers at their outer ends.

16. The device according to claim 10 wherein said means for injecting sealant into the pipe joint includes a hollow drill shaft in communication with a pump for injecting said sealant into the drill shaft and thereby into helical grooves of the drill bit.

17. The device according to claim 11 in which the head is provided with an annular nose biased away from the head in opposition to the direction of the foot.

18. The device according to claim 10 in which the head is pivotally connected to a pair of spaced apart shackle arms extending forwardly of the body, and means for selectively pivoting the head comprises a piston pivotally attached to rear ends of articulating arms, the front ends of which are pivotally attached to the head.

* * * * *